United States Patent [19]
Smith et al.

[11] 3,780,566
[45] Dec. 25, 1973

[54] APPARATUS FOR CONTINUOUSLY MONITORING AIR-POLLUTION

[75] Inventors: Kenneth Burton Smith; Shaul Gladstone, both of Wilmington, Del.

[73] Assignee: Argus Chemical Corp., Brooklyn, N.Y.

[22] Filed: Mar. 7, 1972

[21] Appl. No.: 232,467

[52] U.S. Cl. .............................. 73/23, 73/421.5 R
[51] Int. Cl. ........................................... G01n 31/00
[58] Field of Search .............. 73/23, 421.5 R, 170 R

[56] References Cited
UNITED STATES PATENTS
3,299,700   1/1967   Stout, Jr. ..................... 73/421.5 R
3,479,869   11/1969  Jugle ............................... 73/170 R
2,699,679   1/1955   Munger ........................... 73/170 R Primary Examiner—Jerry W. Myracle
Attorney—Albert L. Gazzola

[57] ABSTRACT

Apparatus and process for continuously monitoring the air pollution around a manufacturing plant comprising a weather vane to sense the direction of the wind, multiple air sampling means positioned to sample air from different compass directions, a valve in line with each air sampling means, an air sample analyzer and recorder, means for transmitting a signal from the weather vane indicating the direction of the wind to the valve which is in line of the air sampling means positioned to sample air in that particular wind direction, means for drawing in an air sample from the atmosphere in the direction of the wind by sucking the air in through the air sampling means, through the valve and into the air analyzer with means in the air analyzer to determine and record the degree of a given air pollutant.

10 Claims, 3 Drawing Figures

APPARATUS FOR CONTINUOUSLY MONITORING AIR-POLLUTION

BACKGROUND OF THE INVENTION

This invention relates to an apparatus and a process for continuously and automatically monitoring and recording the amount of air pollutants in the atmosphere surrounding a manufacturing plant.

In the operation of a manufacturing plant, such as a plant producing chemicals, many different types of anti-air pollution devices are employed. These devices filter, scrub or otherwise clean the gas effluents before they are let to the atmosphere.

It sometimes occurs, however, that the anti-air pollution devices will malfunction or fail to operate properly for one reason or another. Should such a situation go undetected and exist for a sufficient period of time it is possible that the uncleaned effluent would enter and pollute the atmosphere surrounding the plant. It is desirable, therefore, to have an independent check of the atmosphere surrounding the plant to determine the effectiveness of the anti-air pollution devices in service.

Presently, independent atmospheric checks are made manually. That is, a man with an air sampling and testing kit walks to various locations around the plant, samples the air and tests it for pollutants. This is very expensive, time consuming and inefficient.

Therefore, it is desirable to find an apparatus and a process for continuously and automatically sampling and testing the atmosphere surrounding an operating manufacturing plant, and recording the results for a permanent record.

SUMMARY OF THE INVENTION

Accordingly the present invention provides a device for continuously sampling the atmosphere in the direction of the wind to monitor, detect, measure and record the amount of a given constituent in the atmosphere, said device comprised of:

a. multiple air sampling means positioned to sample air from different compass directions;

b. a valve positioned in line with each air sampling means wherein each valve is in a normally closed position and is activated to the open position by an electrical signal;

c. means for detecting the wind direction;

d. means for transmitting a signal indicating the direction of the wind;

e. means for accepting the signal indicating the direction of the wind and using it to operate the appropriate valve which is the valve in line of the air sampling means positioned to sample air in the particular direction that the wind is blowing;

f. an air sample analyzer;

g. means for drawing in an air sample from the atmosphere, in the direction of the wind, by drawing the air in through the air sampling means which is positioned in the direction of the wind, through the open valve and into the air analyzer; and h. means in the air sample analyzer to determine the amount of a given constituent in the air.

DETAILS OF THE INVENTION

Figure 1:
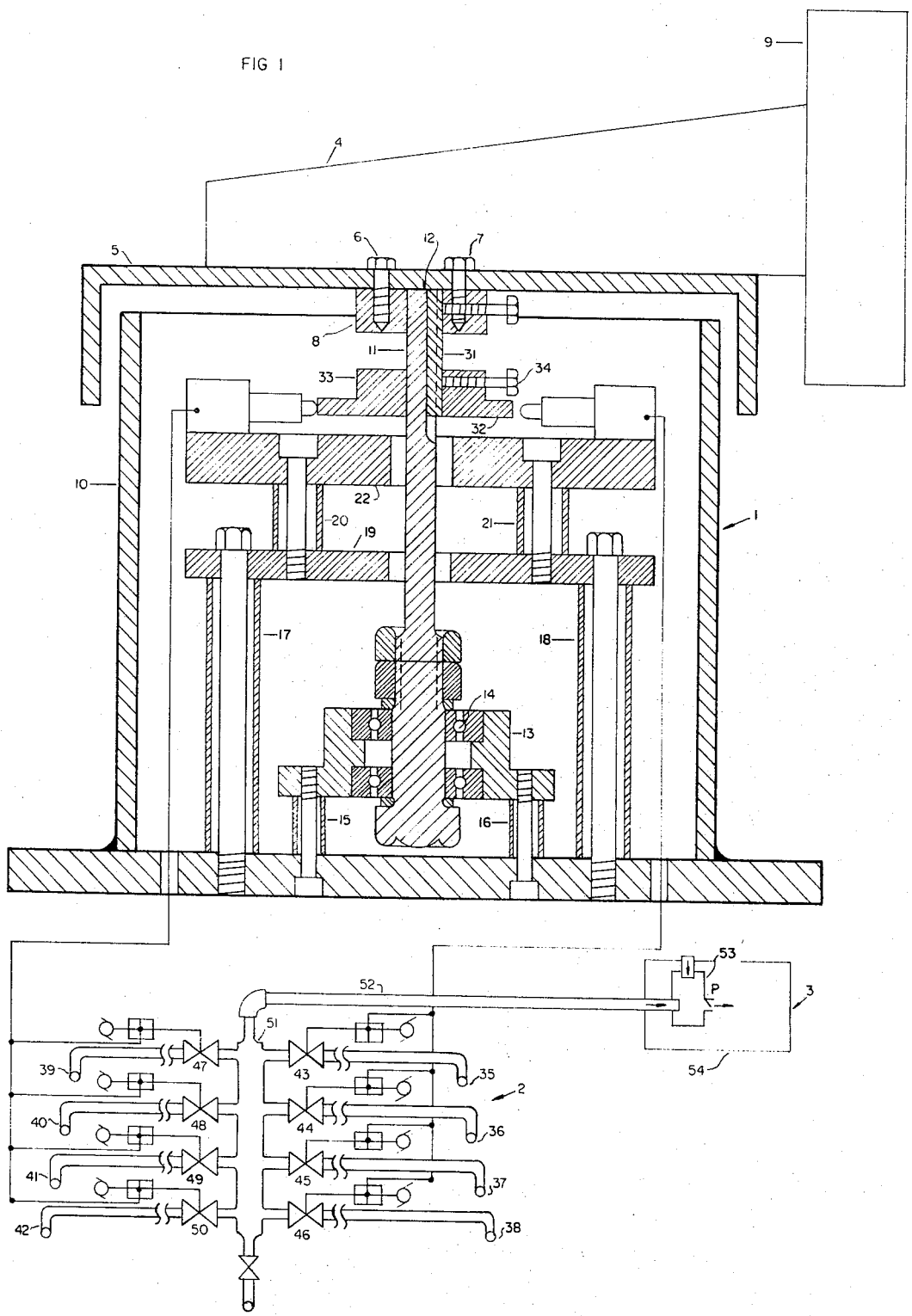
FIG. 1 is partly a cross sectional view of the preferred embodiment of this invention, particularly showing the weather vane, housing and microswitches, whereas the rest of the drawing is a schematic showing the air sampling means and the air sample analyzer.

A preferred embodiment of the apparatus of this invention is described below in conjunction with the drawings. Referring to FIG. 1, the apparatus for ease of description is divided into three systems in accordance with the function performed. System 1 is the wind direction detector and transmitting means, System 2 is the air sampling means and System 3 is the air sample analyzer and recorder. The work "air" as used herein means the atmosphere from which a smaple is to be taken including the sample itself.

The wind direction detector means is comprised of the following assemblage. A vane 4 having a generally trapezoidal configuration that is attached to a circular and flat housing cover 5 by fasteners. Two fasteners 6 and 7 are shown on one side of the vane. Two fasteners, not shown, are also used on the other side of the vane. Note that the fasteners penetrate into a block of metal 8 attached to the cover 5 thereby aiding in maintaining the housing waterproof. Since vane 4 is fastened to the housing cover 5, as the wind changes direction, the vane and housing cover rotate together.

Optionally vane 4 has a flat rectangular appendage 9 attached to increase the surface area made available to sense the wind, thereby increasing the sensitivity of the vane to the wind direction. It is preferred that the vane be sensitive enough to detect at least a one-half mile per hour wind for the best results. The more sensitive the vane the more effective and accurate the pollution sensing will be.

Below the vane and housing cover is a closed end cylindrical housing 10. Inside of housing 10 is a round shaft 11 attached at one end to location 12 which is the inside center of housing cover 5. The other end of shaft 11 is mounted in idler bushing 13 containing preloaded ball bearings 14 which bear against shaft 11. The idler bushing and bearings are conventional and can be commercially obtained from Browning Manufacturing Company, Mausville, Kentucky. Idler bushing 13 is mounted on four vertical supports and two of these supports 15 and 16 are shown.

Also included in housing 10 are four vertical supports wherein two are shown as 17 and 18 supporting flat circular plate 19. The center of plate 19 is cut out to accommodate shaft 11. On top of plate 19 are four vertical supports and two are shown, namely 20 and 21 supporting a flat circular plate 22.

On top of plate 22 are mounted eight microswitches 23, 24, 25, 26, 27, 28, 29 and 30. Microswitches found useful are Model No. BZ-2RQ-18 commercially available from Minneapolis Honeywell Corporation. Above plate 23 and keyed to shaft 11 by mechanical key 31 is cam plate 32. Stabilizing the cam plate and assisting in holding the mechanical key in place is a round plate 33 mounted above and in contact with the cam held in place by a set screw 34.

Figure 2:
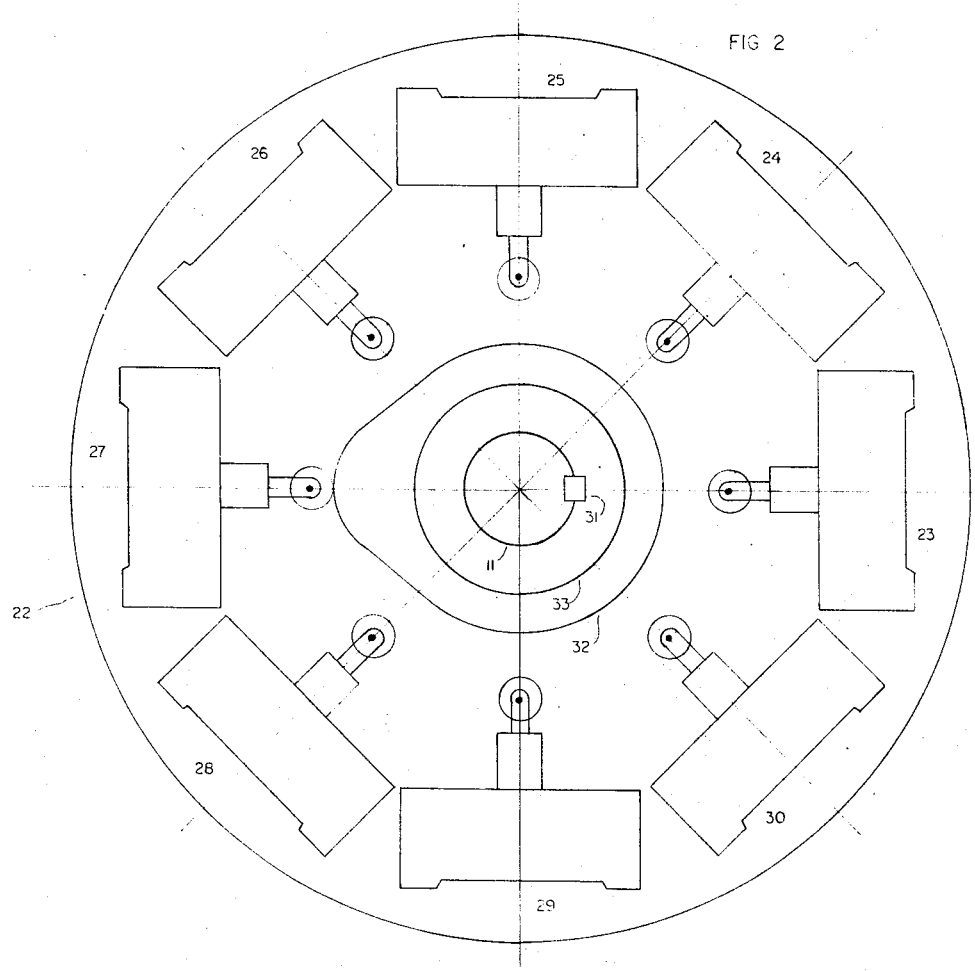
FIG. 2 is a view looking down into the weather vane housing showing the cam and microswitches arranged in the weathervane housing.

For a more detailed look at the top of plate 22 refer to FIG. 2. The microswitches are spaced in a circular configuration equidistant apart around the outer border of plate 22 with the microswitch plunger mechanisms pointing in on a radius towards the center of plate 22. The cam is so designed that the high point on the cam will contact and depress the plunger mechanism on the microswitches. At least one microswitch is depressed, i.e., activated at all times and when the high point on the cam is about centered between two microswitches (plus or minus five degrees) both microswitches are activated.

Since Cam 32 is keyed to shaft 11, the shaft attached to housing cover 5, and the housing cover fastened to weather vane 4, any motion by the weather vane in response to the changing direction of the wind will be transmitted to cam 32 causing the cam to rotate and actuate one microswitch or another.

The complete assembly of wind direction detector and transmitting means mounted on and in the generally cylindrical housing is conveniently mounted outside and exposed in a position to detect the wind such as the top of a building. Since this assembly, in use, is always exposed to the weather it is important that it be sturdy and relatively wind and waterproof.

In the wind direction detector and transmitting means, the sensitivity of the weather vane to the changing direction of the wind can be further improved by reducing the amount of friction against shaft 11. One way of reducing this friction is to use noncontacting microswitches for the contacting plunger type described above. Noncontacting switches include photoelectric switches or sonic detectors.

Referring to FIG. 1, the second system for description is the air sampling means. The air sampling means is comprised of eight sampling tubes 35, 36, 37, 38, 39, 40, 41, and 42 positioned to sample air from different compass directions, a solenoid operated valve 43, 44, 45, 46, 47, 48, 49, and 50 in line with each sampling tube, and all tubes feeding into a common manifold 51.

The sampling tubes can conveniently be made from zirconium, stainless steel, plastic, aluminum, or copper. A material is used that is inert to the pollutant being sampled. Each tube is run to theoutside and the tubes are made to terminate at different locations around a manufacturing plant site preferably on the plant boundary fence. For uniformity and a consistent reference frame, it is convenient to terminate each tube in a different compass direction, i.e., one tube sensing the north wind, another sensing the south wind, etc. In the preferred embodiment, eight sampling tubes are used. Starting with one located on the north side of the plant and thereafter one every 45° around the compass, i.e., northeast, east, southeast, south, etc.

Each solenoid on the valve in line with a sampling tube is electrically connected to a microswitch in housing 10. These valves are normally closed and are activated to the open position when a signal is received from its corresponding microswitch. The solenoid valves and microswitches are connected in such a manner that a microswitch will be activated to transmit a signal to the solenoid valve in line with the sampling tube that is in line with the direction of the wind. For convenience, the microswitches are arranged on the mounting plate 22 in the compass direction to correspond with a sampling tube that is made to sample air in that same direction. For example, when the wind is blowing from the north to the south this rotates the vane so that it points south. In addition any pollution in the air is also directed to the south. Therefore, in order to take a reasonably accurate sample of the atmosphere to determine the level of air pollution a sampling tube is located on the south side of the plant site and correspondingly the high point of the cam is set to point south and activate a microswitch which is positioned on the south side of the support plate. When the switch is activated it will open the valve in the sampling tube line which has its termination point on the south side of the plant.

In a similar fashion each termination point of a sampling tube is made to correspond to a different wind direction, and each sampling tube has a valve in line electrically connected to a microswitch which is activated by the cam attached to the vane in order to sample air in the direction of the wind. By increasing the number of sampling tubes with a corresponding increase in the necessary valves and switches the complete system becomes increasingly accurate. Eight sampling tubes and corresponding apparatus are preferred since this provides practical coverage for the average manufacturing plant.

The third system for description is the air sample analyzer. This is comprised of a suction tube 52 from manifold 51, a vacuum pump 53, and an analyzer 54.

When the wind is blowing in a particular direction, it rotates the vane, which rotates the cam, whereupon the high point on the cam will activate a microswitch positioned in the direction of the wind, transmitting a signal to the solenoid valve in line with the sampling tube which terminates at a location in the direction of the wind. The vacuum pump, continuously in operation, draws air in from the atmosphere through the air sampling tube, through the valve, into the manifold, through suction tube 52 and into the analyzer for an analysis.

The type of analyzer used will depend on the type of analysis desired. Many different types of analyzers are commercially available. One analyzer found useful for determining the amount of hydrogen sulfide ($H_2S$) present in the air is manufactured by Research Appliance Company, Allison Park, Pennsylvania, and is identified as an A.I.S.I. Sampler MOdel No. F-2-Ser air and gas sampler with readout and recorder.

In brief, the analyzer works as follows. Air is drawn into the analyzer through the air sampling system. The sample of air is expelled on to a tape chemically sensitive to $H_2S$. The tape exhibits this sensitivity by becoming darker with increasing amounts of $H_2S$ in the sample. The tape is read by passing it through a light beam wherein the opacity of the tape blocks out varying amounts of light. The amount of light passing through the tape is measured and converted to an electrical impulse. This impulse controls a recording needle which prints out a graph indicating the degree of the various impulses. This is an indication of the amount of $H_2S$ in the air sampled, and a permanent record, thereof.

The analyzer operates on a continuous basis. The entire system can be equipped to provide various information such as, a time sequence record of the sampling, the particular sampling valve through which the sample was taken, thereby indicating the direction of the wind and the degree of pollution of $H_2S$ in the air. Various types of analyzers are available and they can be incorporated to detect various pollutants such as carbon monoxide, carbon dioxide, nitrogen dioxide, and mercury.

A particularly useful attachment is an event recorder. An event recorder is commercially available as Model 292-8 manufactured by Rustrak Instrument Division of Gulton Industries, Inc., Manchester, New Hampshire. This recorder has eight channels — each one attached to a different micro switch. When the microswitch is activated the recorder will record the particular microswitch that is activated, thereby indicating the direction of the wind, the length of time activated and the time of day. This coupled with the record of time and amount of pollution in the air gives a very accurate and complete record of the amount of pollution emanating from a particular plant.

Figure 3:
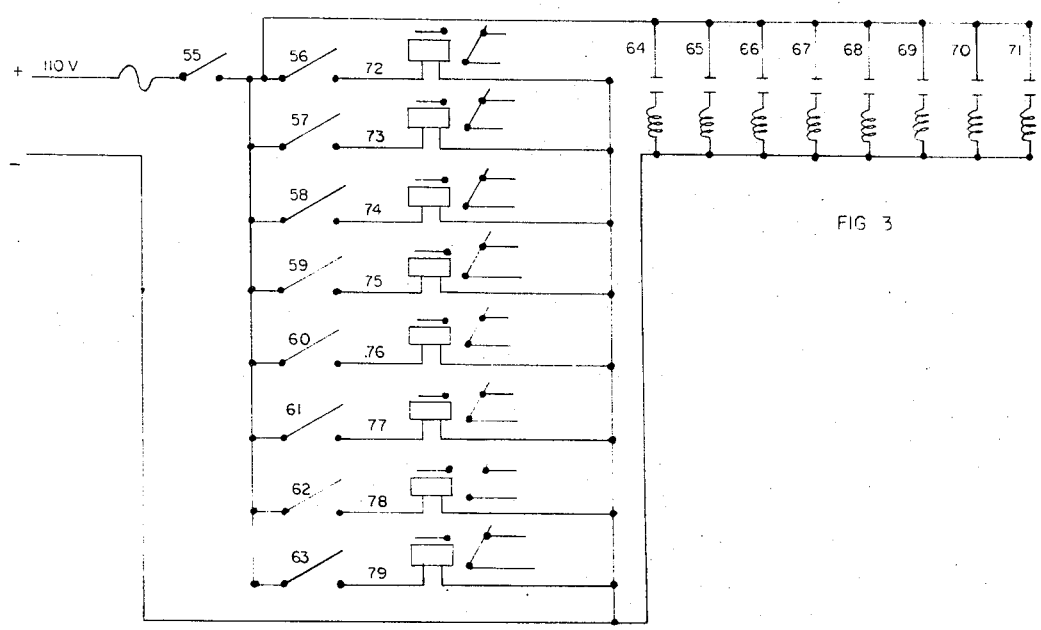
FIG. 3 is an electrical schematic showing the electrical circuits used in the operation of the preferred embodiment.

The electrical aspects of this invention will now be discussed with particular reference to the electrical schematic of FIG. 3. To put the unit in operation, master switch 55 is closed. As weather vane 4 rotates in accordance with the changing direction of the wind, shaft 11 attached to the vane rotates the cam which is keyed to the shaft. As the cam rotates, the high point on the cam depresses a plunger activating a switch. These switches are represented by numerals 56, 57, 58, 59, 60, 61, 62, and 63. Each microswitch is electrically connected to the solenoid portion of the solenoid operated valves through a time delay relay. These solenoids are represented by numerals 64, 65, 66, 67, 68, 69, 70, and 71. The time delay relays are represented by numerals 72, 73, 74, 75, 76, 77, 78, and 79. As the solenoid is activated, it opens a normally closed valve permitting an air sample to be taken.

When a microswitch is deactivated, i.e., the high point on the cam moves off the switch plunger, thereby de-energizing the solenoid. Pneumatic bellows in the solenoid, however, keep the time delay relay contacts closed for 60 seconds thereby holding the valve open for 60 seconds after its corresponding solenoid is deactivated. Thereafter, the relay contacts are open and the valve will return to its normally closed position. This time delay is necessary to keep the valves from opening and closing instantaneously as the weather vane swings with the changing direction of the wind. Otherwise the valves would be worn within a relatively short period of time.

This apparatus is particularly valuable in continuously monitoring the degree of air pollution. When used on a plant site it provides a means for monitoring the degree of pollution emanating from a particular plant. This will provide a means for both plant managers and Government agencies to continuously monitor the air pollution caused by a particular plant.

We claim:

1. A device for continuously sampling the atmosphere in the direction of the wind to monitor, detect and measure the amount of a given constituent in the atmosphere, said device comprised of:
   a. multiple air sampling means positioned to sample air from different compass directions;
   b. a valve positioned in line with each air sampling means wherein each valve is in a normally closed position and is activated to the open position by an electrical signal;
   c. means for detecting the wind direction;
   d. means for transmitting a signal indicating the direction of the wind;
   e. means for accepting the signal indicating the direction of the wind and using this signal to operate the appropriate valve to the open position which is the valve in line of the air sampling means positioned to sample air in the particular direction that the wind is blowing;
   f. an air sample analyzer;
   g. means for drawing in an air sample from the atmosphere, in the direction of the wind, by drawing the air in through the air sampling means which is positioned in the direction of the wind, through the open valve and into the air analyzer; and
   h. means in the air sample analyzer to determine the amount of a given constituent in the air.

2. The apparatus of claim 1 including the additional means for recording the amount of the given constituent analyzed.

3. The apparatus of claim 2 including an event recorder means for recording the length of time and the compass direction of sampling.

4. The apparatus of claim 2 wherein the means for detecting the wind direction is a weather vane.

5. The apparatus of claim 4 wherein the means for transmitting a signal indicating the direction of the wind is a cam fixed to rotate with the weather vane and multiple microswitching means spaced in a circular configuration equidistant apart around the cam wherein the spaced relationship is such that the cam will activate a different microswitch as the cam rotates with the rotation of the weather vane.

6. The apparatus of claim 5 wherein the cam is designed so that when the cam is about centered between two microswitches, the microswitches next adjacent the cam on either side are both activated.

7. The apparatus of claim 5 wherein the microswitching means is a sonic-electric operated microswitch.

8. The apparatus of claim 5 wherein the microswitching means is a photo-electric operated microswitch.

9. The apparatus of claim 5 wherein the microswitching means is a mechanically operated microswitch.

10. The apparatus of claim 9 wherein the multiple air sampling means are hollow tubes, the means for accepting the signal indicating the direction of the wind and using this signal to operate the appropriate valve is a solenoid, and the means for drawing in an air sample from the atmosphere is a vacuum pump.

* * * * *